UNITED STATES PATENT OFFICE.

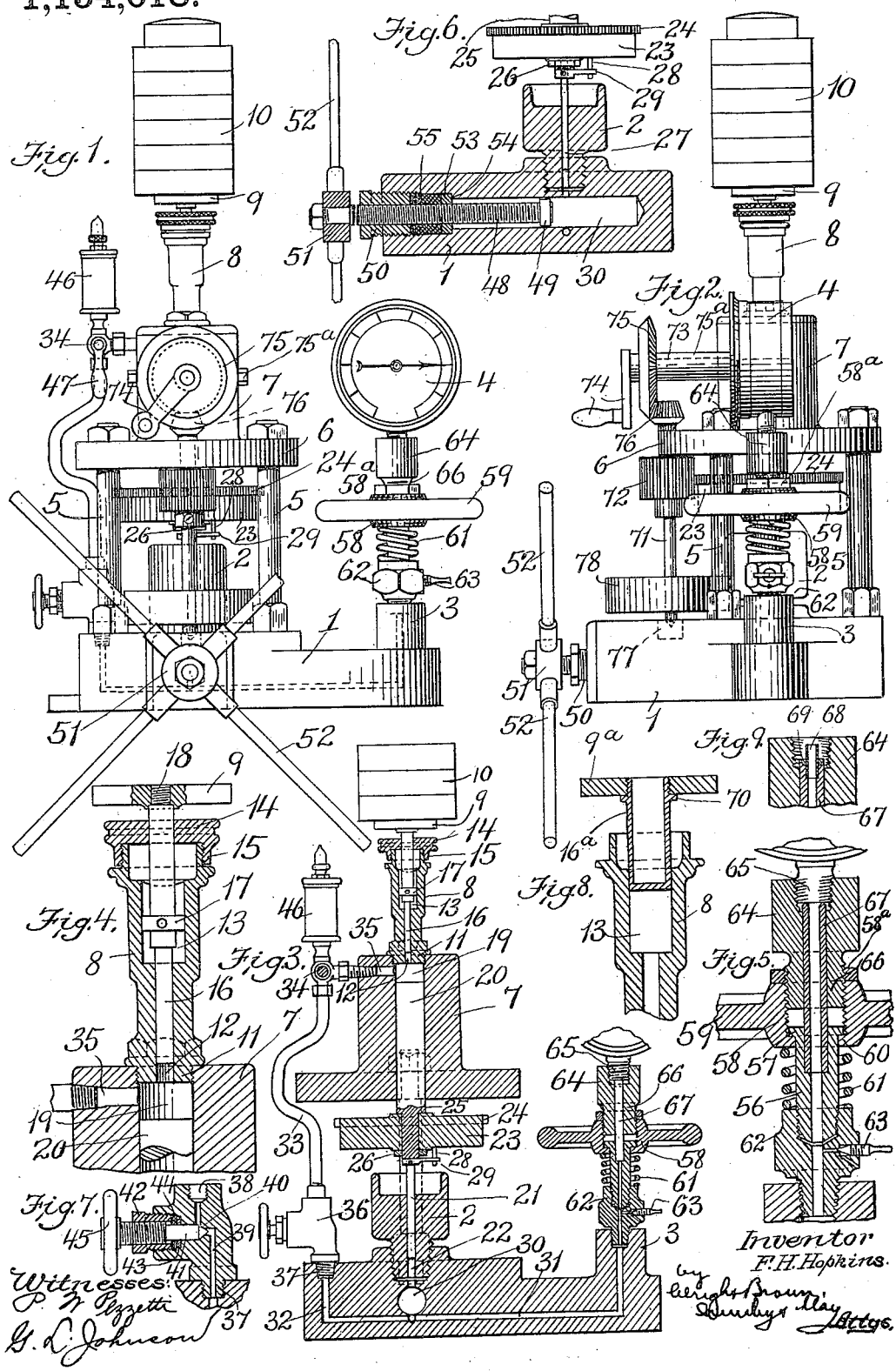

FRANK H. HOPKINS, OF SOMERVILLE, MASSACHUSETTS, ASSIGNOR TO AMERICAN STEAM GAUGE AND VALVE MANUFACTURING COMPANY, OF BOSTON, MASSACHUSETTS, A CORPORATION OF NEW JERSEY.

DEAD-WEIGHT GAGE-TESTER.

1,154,018.   Specification of Letters Patent.   Patented Sept. 21, 1915.

Application filed January 22, 1913. Serial No. 743,521.

*To all whom it may concern:*

Be it known that I, FRANK H. HOPKINS, a citizen of the United States, and resident of Somerville, in the county of Middlesex and State of Massachusetts, have invented certain new and useful Improvements in Dead-Weight Gage-Testers, of which the following is a specification.

The present invention relates to machines or apparatus for testing pressure gages by transmission of pressure from weights of known mass through a confined body of relatively incompressible fluid, such as water or other freely flowing liquid, which is adapted to enter the pressure-measuring element of the gage, and upon which the weights are caused to press. Heretofore gage testers of this type, which are known as "dead weight testers" because weights are employed to act directly upon the transmitting fluid, have been impracticable for testing gages up to very high pressure, on account of the very great size and bulk of the weights required to produce such high pressures.

It is the object of my invention to produce a tester in which pressures may be developed through the direct action of weights to any degree from a fraction of a pound up to twenty-five thousand or more pounds, with the use of weights of moderate size and comparatively few in number, and therefore without requiring excessively large weights or a great number of them. This object is accomplished by compounding or multiplying the fluid pressures produced by the action of the weights so that at the point where such pressures are transmitted to the gage, they are greatly multiplied in amount or intensity, and by providing means whereby the intermediate pressure multiplying members may be temporarily discontinued from operation so that lower pressures may be transmitted from the weight to the gage. An apparatus by which this object is accomplished, and in which my invention is embodied is illustrated in the accompanying drawings and described in detail in the following specification. The particular apparatus is not intended to represent the only possible embodiment of the invention, however, but is shown and described in order to explain the principles of the invention and as being illustrative of one particular embodiment of such principles in concrete form.

In the drawings, Figure 1 is a front elevation of the tester showing a gage connected thereto for testing. Fig. 2 is a side elevation as seen from the right of Fig. 1. Fig. 3 is a vertical section in a plane parallel to that in which Fig. 1 is projected. Fig. 4 is a detail sectional view on a larger scale of the part of the tester in which the weights more directly act. Fig. 5 is a detail sectional view of the connection for the gage. Fig. 6 is a vertical sectional view of the chamber in which the manually operated plunger which is used for putting the tester into operation is contained, said figure showing the plunger in such chamber. Fig. 7 is a sectional view of a needle valve constituting a detail of the tester. Fig. 8 is a sectional view similar to Fig. 4 showing a form of weight and plunger used in substitution for that shown in Fig. 4 for producing lighter pressures. Fig. 9 is a detail view showing in section a modification of the gage connection represented in Fig. 5.

Like reference characters indicate the same or similar parts in all the figures.

In the drawings 1 represents the base of the apparatus, from which rises a cylinder 2 which may be called the "high pressure cylinder," which base is also provided with a nipple 3 to which the gage 4 to be tested is connected by a connection which I will presently describe in detail. Posts 5, of which there are conveniently three rise from the base 1 and support the base 6 of a second or intermediate cylinder 7. Such second cylinder is directly over the high pressure cylinder 2, and the posts 5 are so spaced as to support the same in a sufficiently secure manner. Secured to and rising from the top of the second cylinder 7 is a third cylinder 8 which may be called the "top cylinder" or "primary cylinder", and contains a piston provided with a table 9 on which weights 10 may be removably placed. Referring to Fig. 3 which shows the internal chambers of the various cylinders and the connecting passages, and referring also to Fig. 4 which shows the top cylinder on a larger scale, it will be seen that said top cylinder has a nipple 11 which is screwed into the cylinder 7, and that it contains a chamber or passage 12 in its lower portion opening into said cylinder 7, and that it has a larger chamber 13 in its upper part, into which the chamber 12 opens. The top of said cylinder 8 is closed by a removable cap 14 which has an internally threaded flange 15 engaging external threads at the end of the cylinder. The piston heretofore mentioned as carrying the weight table 9 is shown in Figs. 3 and 4, and is made at its lower end as a piston 16 fitting the chamber 12. Its upper portion which passes through the enlarged chamber 13 may be larger than the piston portion 16, as shown, and is equipped with a stop collar 17 fitting freely in the chamber 13, the purpose of which collar is to prevent the piston from leaving the chamber 12 when it is raised by displacement of the transmission fluid through the application of pressure as hereinafter described. Said stop collar by striking the cap 14 prevents removal of the piston. The stem of the piston passes through the cap 14, through which it is adapted to slide endwise freely, and is threaded at 18 to enable the table 9 to be secured upon it. When the cap 14 is removed the top cylinder is open at the upper end, whereupon the piston 16 may be removed for the purpose of substituting another piston, as I shall presently describe.

The second or intermediate cylinder has a chamber 19 in which is contained a piston 20, such piston extending below the base of the cylinder 7 and resting on a piston 21 in the chamber 22 in the high pressure or first cylinder 2. It will be noted that the piston 21 and chamber 22 are of much smaller diameter than the piston 20 and chamber 19. This difference in diameter is provided in order that a known fluid pressure on the piston 20 may be employed to produce a many times greater pressure in the chamber 22. On the piston 20 there is secured a weight 23 of known value, which is also of symmetrical form with respect to the axis of the piston and is equipped with teeth 24 for a purpose which I will presently describe. This weight is centrally apertured and placed on the reduced lower end of piston 20, being secured thereon and held against a shoulder 25 by a nut 26 screwed on the piston below the weight. Projecting from the under side of the weight 23 is a pin 28 which crosses a dog 29 secured to and projecting from the piston 21, the purpose of which will be presently described.

While it is not material to the invention how the several cylinders are made, that is, whether or not they are integrally connected, I may state that for practical reasons I prefer to make them all structurally independent of one another and also of the base 1, the high pressure cylinder being provided with a nipple which is threaded into the base as shown in Fig. 3, the intermediate piston being supported by posts 5 rising from the base as shown, and the primary cylinder being detachably connected to the intermediate cylinder.

The chamber 22 opens into a transverse chamber 30 in the base 1 from which extend a passage 31 and a passage 32, the former extending through the gage connection nipple 3 and the latter extending into communication with a by-pass 33. Such by-pass runs from a three-way cock 34, connecting with a passage 35 in the side of the cylinder 7 communicating with the chamber 19, to a needle valve casing 36 which is screwed into the base in the external orifice of the passage 32. Said needle valve casing and the contained valve are shown in detail in Fig. 7. The casing has a threaded nipple 37 at one end, and at its opposite end has a threaded opening 38 to receive the coupling of the by-pass pipe 33. A passage 39 runs through the needle valve casing and is offset at an interior point so as to provide a valve seat 40 with which a needle valve 41 co-acts. Said needle valve passes through a stuffing box consisting of a gland 42 screwed into the side of the casing and through which the stem of the needle valve is threaded. Surrounding the needle valve is a washer 43 which bears against a shoulder between the needle valve passage and the gland opening, and between which and the end of the gland there is a packing 44 which is compressed by the gland against the needle valve on all sides. The external end of the needle valve stem is provided with a hand wheel 45 or equivalent handle by which it may be rotated in being closed or opened. In the construction of the needle valve and its packing I have produced a new and improved construction which allows the valve to be packed securely so as to prevent leakage of fluid at very high pressures and being at the same time small and compact.

The three-way cock 34 previously mentioned has three distinct openings into its casing, one being from the chamber 19, the other being to the by-pass pipe 33 and the third being to a tank or reservoir 46 which contains a supply of the pressure transmitting fluid. By suitably turning the cock, which has a handle 47 shown in Fig. 1, the chamber 19 can be put into communication either with the tank 46 or with the by-pass 33, or it may be entirely closed, and the tank 46 may be put into communication with the chambers and passages contained in the base 1 when the cock is suitably positioned and the needle valve is opened.

In the chamber 30 of the base there is contained a pressure plunger 48 formed as a screw so that it may be advanced with great power by the application of manual force. This screw plunger has a stop collar 49 on the end within the chamber 30 to prevent the plunger from being withdrawn from the chamber and passes through a gland 50 in the open end of chamber 30 at the side of the base, with which gland it has a threaded engagement. Secured to the outer end of the screw plunger there is a collar 51 having lever arms 52. The gland and packing for the screw plunger are of the same character as the gland and packing for the needle valve. There is a washer 53 surrounding the screw plunger loosely and bearing against a shoulder 54 in the chamber 30, while also surrounding the plunger and compressed between the gland and the washer is a quantity of packing material 55.

The connection by which the gage to be tested is detachably connected to the tester is best shown in enlarged sectional view in Fig. 5. A tube 56 has a tapered threaded end which is screwed into a relief valve casing 62, provided to drain the gage, which in turn is screwed into the base in a threaded socket forming the external orifice of the passage 31. This tube has on its end a flange 57 which retains a nut 58 rotatably mounted on the tube. Said nut is formed as the hub of a hand wheel 59 and has at one end of its threaded internal opening a lip 60 which underlies the flange 57. A spring 61 surrounds the tube 56 and abuts against the relief valve casing 62 which contains the needle valve 63, said spring also pressing against the nut and holding its lip 60 up to the flange 57. A block 64 which has a threaded recess adapted to receive the threaded nipple 65 of the gage, has a neck 66 which is engaged with the threads in the nut 58, and a lock nut 58ª is also threaded upon said neck 66 and is crowded against the end of the nut 58 or hand wheel hub. A tube 67 of hard material, suitably steel, is contained in the upper end of the tube 56, and passes through the block 64 to a point somewhat beyond the bottom of the recess in the latter. The upper end of this hard tube is provided with a beveled sharp edge adapted to indent the end of the gage nipple 65 surrounding the passage through the latter and to make a tight joint therewith. When the lock nut is set up against the hand wheel hub, the latter is firmly connected with the block 64, and said block can then be rotated by the hand wheel. In attaching a gage to the tester, the nipple or stem of the gage is set into the socket of the block 64 and pressed down until its end bears against the steel tube 67. The block and hand wheel are thereby moved together downwardly against the yielding resistance of spring 61. Then the hand wheel is rotated, and the block 64 is screwed up on the gage nipple 65 until the lip 60 bears against the flange 57. The threaded connection between the hand wheel and block 64 permits an adjustment of the block to accommodate variations in the length and diameter of gage stems to insure that the gage stem will be pressed against tube 67 when the block has risen as far as the lip 60 and flange 57 permit. The lock nut 58 merely maintains these adjustments and causes the hand wheel and block 64 to turn as a unit. As the hand wheel is relatively large and the parts with which it engages are strong, it is possible to press the gage nipple against the tube 67 with great force, so that the tube may indent the nipple and produce a leakage-tight joint.

An alternative construction for obtaining a tight joint is shown in Fig. 9. Here the tube 67 instead of having a sharp edge is provided with a thimble 68 which projects from its end and is adapted to enter the bore in the gage nipple. Around this thimble and seated in a recess in the end of the tube is a washer 69. The washer is compressed when the gage nipple is drawn against the end of the tube 67 as already described, and thereby makes a leakage-tight joint. The only purpose of the thimble is to confine the washer and prevent it from being crowded by the pressure to which it is subjected so far across the passage as to obstruct the latter. Fig. 8 shows an alternative form of piston adapted to be substituted for the piston 16 shown in Figs. 3 and 4. This piston 16ª is made of a size to fit the enlarged chamber 13 in the top cylinder 8. On the upper end of piston 16ª there is provided a screw thread, and adjacent to such thread a shoulder 70, by which the weight table 9ª is positioned and secured. In the use of the apparatus it is sometimes necessary, for purposes which I will presently name, to substitute the piston 16ª for the piston 16, and vice versa, and in making such substitution it is necessary only to remove the cap 14 if the piston 16 is in place, removing with it the contained piston, and to substitute therefor the other piston 16ª, or the reverse.

In the operation of the tester it is necessary that the pistons 16, 20, and 21 should slide in their respective cylinders freely under the pressure produced by movement of the screw plunger 48, and that these pistons should not stick. Sticking of the pistons 20 and 21 would be a serious matter and would vitiate the results obtained by the tester. Accordingly I provide a mechanism for keeping these pistons in continuous rotation whenever the tester is in use, thereby applying sufficient force to overcome any tendency to stick which there might be after the pistons had remained stationary for some length of time, and applying this force in such a way that it does not affect the dead pressures employed in the operation of the tester. Said mechanism comprises an upright shaft 71 having a spur pinion 72 and a horizontal shaft 73 having a crank 74 and a beveled gear 75 which meshes with a bevel pinion 76 on the shaft 71. Shaft 73 is supported by a bracket 75ª which is secured upon the side of cylinder 7, and the shaft 71 has a pivot bearing at its lower end in a hardened block 77 set into the base 1, while its upper end is contained in a bearing in the base plate 6, through which the shaft passes. The gear pinion 72 meshes with the spur teeth 24 of the shaft 23 and has a long face, as shown in Figs. 1 and 2, the length of its face being sufficient to permit the weight to move up and down, that is, axially, through a considerable distance without bringing its teeth out of mesh with those of the pinion. On shaft 71 is also secured a fly wheel 78, the purpose of which is to regulate the speed of this rotating mechanism, and allow it to be turned slowly but continuously and at a substantially uniform speed, even though the motive power is applied manually to the crank 74. It will be understood that when the crank 74 is rotated, the shaft 71 is also rotated with its fly wheel and pinion, and that through the engagement of the latter with the teeth 24, the weight 23 and attached piston 20 are also rotated. In its rotation the pin 28 of the weight engages the dog 29 of piston 21 and rotates the last named piston also. Thus by applying an occasional impulse to the crank while the tester is being used, the pistons may be kept in continuous rotation sufficiently to overcome any tendency to stick which there might be if the pistons were allowed to become stationary. As the rotating impulse is applied in a direction perpendicular to the axis of the pistons, while the testing pressures are applied to the latter only in the direction of their axis, it is evident that the force producing rotation in no wise increases or diminishes the force exerted through the tester by the weights.

Having fully described the details of construction of the particular embodiment of my invention herein illustrated, I will now describe the manner in which the tester operates in use, and will explain the fundamental principles of my invention involved in this construction.

In the condition prior to use, the screw plunger 48 is withdrawn, and the chambers 30, 22 and passages 31, 32 are filled with the pressure transmitting fluid, and so also are the chamber 19 and the chamber 12. When no gage is connected to the cylinder, the pressure transmitting fluid, being unconfined, allows the pistons and weights to gravitate to their lowest possible positions, where they arrest against the frame parts of the tester. Now assuming that a gage is connected with the tester and made tight as described, and that the needle valve 36 and three-way cock 34 are closed so that there is no outlet from the passage 32 or from the chamber 19, the operator first turns the crank 74 so as to set the pistons 20 and 21 into rotation and overcome the friction of repose of such pistons in their chambers. Then the screw plunger 48 is turned by means of the handles 52 until sufficient of the fluid is displaced from the chamber 30 into the cylinder chamber 22 to lift piston 21, weight 23 and piston 20, and by the upward movement of the latter to displace the fluid in chamber 19 sufficiently to lift piston 16 and the weights supported thereby. In other words, the operator turns the handles of the plunger until the weight table 9 is raised slightly and floats. The pressure thus produced in the transmitting fluid is indicated by the pointer of the gage, and is measured by the weights resting on the piston 16, when multiplied by factors determined according to the design of the machine. The pressure applied by the piston 16 on the piston 20 is multiplied by the larger area of that piston, and is added to the dead weight of the piston 20 and weight 23. This weight is then concentrated on the small piston 21, to produce a very high unit pressure.

Without limiting my invention to any particular dimensions, I may say that in a tester which has been built, the weight of the piston 16 and table 9 is ten ounces and that the piston 16 is one-sixteenth of a square inch in area. The piston 20 has a transverse area of one square inch, hence the fluid pressure acting upon its upper end is multiplied sixteen times and becomes ten pounds. The weight of the piston 20 and weight 23 together equals ten pounds, and this being added to the pressure acting on the piston 20, produces a total pressure of twenty pounds on the piston 21. The latter piston is one-tenth of a square inch in transverse area, whereby the pressure applied by it to the gage, in terms of pressures per square inch is multiplied ten times and becomes two hundred pounds. Thus in a tester of the particular design referred to a weight of ten ounces in the top cylinder acting through the intermediate pistons produces a pressure of one hundred pounds per square inch at the gage. If the intermediate pistons and the transmission fluid resting on piston 20 had no weight whatever the indication at the gage produced by the ten ounce weight would be one hundred pounds, but as such intermediate pistons and this fluid necessarily have some weight, the pressure due to this weight is added to that produced by the top plunger and it is made of a definite known amount so as to be easily reckoned with. On account of the multiplication of pressure through the secondary or intermediate cylinder and the pistons therein and in the high pressure cylinder, it is possible to test gages up to exceedingly high pressure by the direct action in a vertical line of calibrating or testing weights 10 which are not prohibitively heavy or bulky. The foregoing figures are given for illustration, and they may be varied in any particular tester without in any degree departing from my invention. Generally stated the principle of my invention is the multiplication of dead weight pressure by interposed, fluid-operated and operating members, whatever the dimensions and proportions of such members may be, and whatever the product of such multiplication in consequence may be in a testing apparatus adapted to test the calibration of pressure gages. Expressing the idea by a general formula regardless of actual quantities, the unit pressure produced at the gage by a weight represented as A, is $$A \times R \times N,$$

where R is the ratio between the areas of the piston 20 and the piston 16, and N is the reciprocal of the area of the piston 21 in terms of the unit pressure area with reference to which the gage is calibrated. When it is desired to calibrate or test a gage for smaller pressures than the least produced through this multiplication, that is, in a tester of the sort here described, for pressures less than one hundred and sixty times the pressure of the weights acting through the plunger 16, the by-pass 33 is called into operation through the opening of needle valve 41 and the placing of cock 34 in position for connecting the by-pass pipe with passage 35. Then the pressure produced by the piston 16 is transmitted through the by-pass, past the multiplying piston, to the gage. This equalizes the pressures in chambers 19 and 22. The piston 20, being larger than piston 21, is forced down until the weight 23 is at rest on the top of cylinder 2 and, when the area of piston 16 is one-sixteenth of a square inch, the unit pressure produced at the gage is then only sixteen times the gravity pressure of the weights. That is, the factor N of the above formula is omitted, and the factor R becomes the reciprocal of the area of piston 16 in terms of the unit pressure area. For calibrating still lower pressures, the piston 16ª is substituted for the piston 16, and having a larger pressure area than that of piston 16, it produces a less pressure at the gage. Assuming that the area of piston 16ª is ten times that of piston 16, then the pressures produced at the gage are only one and six-tenths times the weight of piston 16ª, or in other words, one-tenth of the pressures produced by piston 16, when the dead weights are the same. Still another mode of using the tester whereby even smaller readings by the use of the same weights may be obtained, is to connect the gage at the top of the second cylinder 7, disconnecting the top cylinder, to permit this, and then connecting the top cylinder to the gage coupling in communication with the nipple 3 of the base, weights having first been applied to the piston in said top cylinder, sufficient in total mass to balance the pressure caused by the weight of the pistons 20 and 21 and the weight 23. In this way the dead weight pressures produced are reduced in being transmitted to the gage, and the unit pressures indicated by the latter are only one-tenth as great as the pressures of the weights. Thus with the tester designed as herein illustrated and described gage readings may be produced by the direct action of weights equal respectively to one-tenth, 1.6 times, sixteen times, and one hundred and sixty times the actual pressures produced by the weights, or in other words the tester enables the pressures of the weights to be modified by four different factors in being transmitted to the gage. The change from the direct action of piston 16 to the indirect action through the pistons 20 and 21 and vice versa is made with the utmost ease and despatch by respectively opening or closing the needle valve 41.

The chambers 12 and 19 constitute mutually communicating chambers, in which are the disconnected pistons 16 and 20 one of which acts on, and the other of which is acted upon by, the pressure transmitting fluid; while the chamber 22 is in communication with the gage, but not with the chambers 12 and 19, and as concerns these two chambers, may be considered a non-communicating chamber. The pistons 20 and 21 are mechanically connected pistons operating respectively in the non-communicating chambers 19 and 22. When the top cylinder and gage are transposed for the purpose of producing pressures at the gage less than those directly produced by the weights, then the chambers 12 and 22 are the mutually communicating chambers, the chamber 19 is the one in communication with the gage and non-communicating as respects the other chambers, and the pistons 20 and 21 are still mechanically connected pistons in respectively non-communicating chambers.

In the foregoing description and in certain of the following claims I have used the terms "cylinder" in description of the members 2, 7, and 8, and the term "piston" in description of the members 16, 20 and 21. I desire to state that these terms are used as terms of description and not of limitation, because it is immaterial for all purposes except one whether the cylinder and piston are geometrically cylindrical in form or not, and whether the pistons fit the interior chambers in the several cylinders, or not. The only purpose for which cylindrical form of the chambers and pistons is required, is that of permitting rotation to prevent sticking, and for all other purposes these elements may have any other shape. Accordingly it is to be understood that in all the claims where I refer to "cylinders" and "pistons", I do not intend to limit my invention to elements having geometrically cylindrical shapes or to pistons fitting the chambers in which they operate, but by these terms I intend to include any elements however formed which are capable in a broad way of accomplishing functions corresponding to those performed by the elements above referred to of my apparatus.

I claim:

1. A gage tester, comprising a chamber containing transmission fluid, a weight-actuated piston operating in said chamber, a second piston having a different area from the first piston operated by such fluid, a second chamber, a third piston operating in said chamber having a different area from the two first-named pistons and connected to the second piston, said second chamber being in communication with the gage to be tested.

2. A gage tester, including a plurality of chambers, one of which is in communication with the gage to be tested, and all of which contain a pressure-transmitting fluid, weight-operated means for producing a pressure in one of said chambers, and intermediate means between said chamber and that chamber which is in communication with the gage for transmitting a modified pressure to the gage.

3. A gage tester, comprising chambers containing transmission fluid means for mounting a gage in condition to admit such fluid and means for applying pressure to such fluid by direct action of a weight, and means for multiplying by a known factor the pressure so produced in its transmission to the gage being tested.

4. A gage tester, comprising communicating chambers of different areas containing a transmission fluid, a weight-actuated piston in one of said chambers, a fluid-actuated piston in the other of said chambers, a third chamber containing transmission fluid, and a piston contained in said third chamber, and mechanically operated by the second-named piston, the last-named chamber being in communication with the gage being tested.

5. A gage tester, including in its construction a plurality of chambers, two of which are in mutual communication and one of which is separated from the said two chambers and is in communication with the gage, mechanically connected pistons of different areas contained respectively in the non-communicating chambers, and a third piston of still a different area contained in one of the communicating chambers and having means for supporting a weight.

6. A gage tester, comprising essentially a chamber containing transmission fluid, a weight-actuated piston operating in said chamber, a second chamber in communication with the first-named chamber, a second piston in said second chamber having a different area from that of the first-named piston, a third chamber in communication with the gage to be tested, and a third piston operating in said third chamber and mechanically connected with the second-named piston.

7. A gage tester, comprising essentially a chamber containing transmission fluid, a weight-actuated piston operating in said chamber, a second chamber in communication with the first-named chamber, a second piston in said second chamber having a different area from that of the first-named piston, a third chamber in communication with the gage to be tested, a third piston operating in said third chamber and mechanically connected with the second-named piston, and a by-pass from the second to the third chamber arranged to transmit pressure directly from the second to the third chamber without causing actuation of the second and third pistons.

8. A gage tester, comprising communicating chambers containing a pressure transmitting fluid, disconnected pistons of different areas in said chambers, one of said pistons being weight actuated and the other being pressed upon by the fluid in said chambers, a separate chamber in communication with the gage to be tested and containing fluid, and a piston acting in the last named chamber and mechanically actuated by the second of the before-named pistons.

9. A gage tester, comprising communicating chambers containing a pressure transmitting fluid, disconnected pistons of different areas in said chambers, one of said pistons being weight actuated and the other being pressed upon by the fluid, a separate chamber in communication with the gage to be tested and containing fluid, a piston acting in the last named chamber and mechanically actuated by the second of the before-named pistons and means for establishing communication directly from the chamber containing the weight-actuated piston to the gage.

10. A gage tester, comprising communicating chambers containing a pressure transmitting fluid, disconnected pistons of different areas in said chambers, one of said pistons being weight-actuated and the other being pressed upon by the fluid, a separate chamber in communication with the gage to be tested and containing fluid, a piston acting in the last named chamber and mechanically actuated by the second of the before-named pistons and driving mechanism for moving said mechanically connected pistons.

11. A gage tester, comprising communicating chambers containing a pressure transmitting fluid, disconnected pistons of different areas in said chambers, one of said pistons being weight actuated and the other being pressed upon by the fluid, a separate chamber in communication with the gage to be tested and containing fluid, a piston acting in the last named chamber and mechanically actuated by the second of the before-named pistons and means for displacing the pressure-transmitting fluid so as to raise the pistons.

12. A gage tester, comprising communicating chambers containing a pressure transmitting fluid, disconnected pistons of different areas in said chambers, one of said pistons being weight actuated and the other being pressed upon by the fluid, a separate chamber in communication with the gage to be tested and containing fluid, a piston acting in the last named chamber and mechanically actuated by the second of the before-named pistons, and manually actuated means acting to displace the fluid in the last named chamber so as to raise the piston therein, and thereby raise all the pistons.

13. A dead weight gage tester comprising in combination a base having a portion to which a gage to be tested may be connected, a high pressure cylinder connected to said base, said base having a passage connecting said portion and the high pressure cylinder together, a piston in said high pressure cylinder, an intermediate cylinder, a second piston contained in said intermediate cylinder and engaged with the first named piston so as to operate the latter by mechanical action, a primary cylinder in communication with the intermediate cylinder, a weight actuated piston operating in said primary cylinder to apply fluid pressure to the second named piston, and a by-pass having a valve, and arranged to transmit pressure directly from the primary cylinder to that portion of the base with which the gage is connected, without applying unbalanced pressure to either the first-named or the second piston.

14. A gage tester comprising a cylinder containing fluid and in communication with the gage to be tested, a weight actuated piston acting in said chamber, and mechanism for moving said piston independently and in a direction transverse to such movement to prevent sticking of the piston.

15. A gage tester comprising a cylinder containing fluid and in communication with the gage to be tested, a weight-actuated piston acting in said chamber, and mechanism for moving said piston rotatably about its axis to prevent sticking of the piston in the cylinder.

16. A gage tester comprising in its construction, disconnected cylinders, one of which is in communication with the gage to be tested, mechanically connected pistons in said cylinders respectively and weight operated means for producing pressure in the other cylinder than that which is connected with the gage, a gear element connected to said piston and gearing meshing with said gear element for rotating said pistons to prevent sticking thereof in their cylinders.

17. A gage tester comprising in its construction, disconnected cylinders, one of which is in communication with the gage to be tested, mechanically connected pistons in said cylinders respectively and weight operated means for producing pressure in the other cylinder than that which is connected with the gage, a gear element connected to said piston and a rotatable shaft mounted adjacent to said element, a pinion on said shaft meshing with said gear element, and a crank connected with said shaft for rotating the same and thereby rotating said pistons to prevent the latter from sticking in their cylinders.

18. A dead weight gage tester comprising in its construction a base having a connector for a gage, and having a cylinder in communication with said connector, an intermediate cylinder, mechanically connected pistons in said first-named cylinder and intermediate cylinder, and a primary cylinder connected with said intermediate cylinder and containing a weight-actuated piston, said primary cylinder being adapted to be disconnected from said intermediate cylinder and to be connected with the gage connector, and the gage to be tested being connectible, in place of the primary cylinder, with the intermediate cylinder, whereby to transmit reduced pressures from the weight to the gage.

19. A connection for attaching a gage to a tester, comprising a tube, a nut rotatably mounted on said tube, a nipple engaged with said nut having a threaded socket to receive the nipple of the gage, and an extension tube passing from the first named tube through said nipple and constructed to make a fluid tight connection with the end of the gage nipple.

20. A connection for attaching a gage to a testing machine comprising a tube connected with the testing machine and having a tubular extension of diameter intermediate the external and internal diameters of the gage nipple, a nut rotatably mounted on such tube extending beyond the end thereof to an extent less than said tubular extension, a block surrounding said tubular extension having an internally threaded socket to receive the nipple of the gage and having an externally threaded neck to engage said nut, said block being engageable with the gage nipple and being movable by said nut to bring the gage nipple into fluid tight connection with the tubular extension.

21. In a dead weight gage tester, a pressure cylinder having communicating chambers of different diameters, a piston fitting the chamber of smaller diameter, means for transmitting pressure from said chamber to a gage to be tested, a cap extending over the end of the chamber of larger diameter, through which cap the piston rod passes, and a stop on the piston rod contained in the chamber of larger diameter and adapted to engage said cap for preventing displacement of the piston from the chamber.

22. In a dead weight gage tester, a cylinder having a chamber adapted to contain fluid, a weight-actuated piston fitting said chamber and extending out from the end thereof, and complemental stops mounted upon said cylinder and piston respectively for preventing displacement of the piston from the chamber.

23. A gage tester comprising a fluid-containing chamber, a weight-actuated piston at the end of said chamber, intermediate chambers and pistons operated by the fluid displaced from the first-named chamber and adapted to transmit fluid pressure to the gage to be tested, a by-pass for transmitting pressure fluid directly from the first-named chamber to the gage, and a valve opening and shutting off said by-pass, said valve being adapted to withstand severe fluid pressures and comprising a relatively massive casing having a passage through it, said passage being offset between its ends to provide a valve seat, a needle valve having a tapered end, fitting said seat and said needle valve passing through a side of the casing, a gland threaded into the side of the casing surrounding the needle valve and having an internal thread with which a thread on the needle valve meshes and packing contained between the end of said valve, the needle valve and the adjacent parts of the valve casing.

24. A gage tester comprising a chamber adapted to contain fluid and having provisions for connection with a gage, a weight-actuated piston exposed to the pressure of fluid in said chamber, a screw plunger extending into the chamber manually operable for applying pressure to the fluid therein, and a stuffing box through which said plunger passes into the chamber, including a gland in threaded engagement with the plunger, a washer loosely surrounding the plunger, and packing material interposed between said gland and washer.

25. In a dead weight gage tester, a chamber adapted to contain fluid and having communication with the gage to be tested, a weight impelled piston exposed to the pressure of said fluid, a plunger passing into said chamber and operable to apply pressure to the fluid therein, means for packing the opening to the chamber through which said plunger passes, said packing means including a ring loosely surrounding the plunger, and an enlargement on the plunger within the chamber adapted to prevent withdrawal of the plunger from the chamber by engagement with said ring.

26. In a dead weight gage tester, a chamber adapted to contain fluid, means for making communication from said chamber to a gage to be tested, a weight impelled piston exposed to the pressure of fluid in said chamber, a screw plunger entering said chamber for applying pressure to the fluid therein, said chamber having a shoulder surrounding said plunger, and means for packing the entrance to the chamber through which the plunger passes, said packing means comprising a gland threaded into the entrance to the chamber and in threaded mesh with the screw plunger, a washer surrounding the plunger and abutting against said shoulder, and packing material contained between said washer and said gland.

27. In a dead weight gage tester, a chamber adapted to contain fluid, means for making communication from said chamber to a gage to be tested, a weight impelled piston exposed to the pressure of fluid in said chamber, a screw plunger entering said chamber for applying pressure to the fluid therein, said chamber having a shoulder surrounding said plunger, and means for packing the entrance to the chamber through which the plunger passes, said packing means comprising a gland threaded into the entrance to the chamber and in threaded mesh with the screw plunger, a washer surrounding the plunger and abutting against said shoulder, and packing material contained between said washer and said gland, said plunger having a head or stop within the chamber adapted to contact with said washer and prevent complete withdrawal of the plunger from the chamber.

28. A dead weight gage testing apparatus, comprising a weight impelled piston, a chamber adapted to contain fluid in which said piston acts, a second piston of different area from the first named piston exposed to the pressure of the fluid on which the first piston acts, a third piston mechanically actuated by the second piston, a chamber in which said third piston operates, containing a pressure-transmitting fluid, and means for connecting a gage in fluid-receiving communication with the last-named chamber.

29. A dead weight gage testing apparatus, comprising a weight impelled piston, a chamber adapted to contain fluid in which said piston acts, a second piston of different area from the first-named piston exposed to the pressure of the fluid on which the first piston acts, a third piston machanically actuated by the second piston, a chamber in which said third piston operates, containing a pressure-transmitting fluid, means for connecting a gage in fluid-receiving communication with the last-named chamber, and means for applying pressure to the fluid contained in the last-named chamber.

In testimony whereof I have affixed my signature, in presence of two witnesses.

FRANK H. HOPKINS.

Witnesses:
ARTHUR H. BROWN,
P. N. PEZZETTI.

Copies of this patent may be obtained for five cents each, by addressing the "Commissioner of Patents, Washington, D. C."